United States Patent [19]

Flierl et al.

[11] Patent Number: 4,810,390

[45] Date of Patent: Mar. 7, 1989

[54] SEPARATION AND PURIFICATION OF PIGMENT SUSPENSIONS AND SUSPENSIONS OF PIGMENT INTERMEDIATES BY A MEMBRANE SEPARATION PROCESS

[75] Inventors: Klaus Flierl, Basel; Heinz Pfenninger, Lupsingen; Hans-Rudolf Marfurt, Rheinfelden, all of Switzerland

[73] Assignee: Ciba-Geigy Corporation, Ardsley, N.Y.

[21] Appl. No.: 102,941

[22] Filed: Sep. 30, 1987

[30] Foreign Application Priority Data

Oct. 10, 1986 [CH] Switzerland ............... 4062/86

[51] Int. Cl.⁴ .................................. A63H 13/00
[52] U.S. Cl. ........................ 210/650; 210/772; 210/797; 106/493
[58] Field of Search ........... 210/636, 650, 651, 770, 210/772, 652, 797; 106/309, 493

[56] References Cited

U.S. PATENT DOCUMENTS

| | | | |
|---|---|---|---|
| 3,528,365 | 9/1970 | List ............................... | 210/770 |
| 3,567,675 | 3/1971 | Merck ........................... | 210/772 |
| 3,977,967 | 8/1976 | Trulson et al. ................ | 210/639 |
| 4,069,157 | 1/1978 | Hoover et al. ................ | 210/651 |
| 4,088,577 | 5/1978 | Müller .......................... | 210/770 |
| 4,329,145 | 5/1982 | Koll et al. ..................... | 210/650 |
| 4,385,903 | 5/1983 | Moriyama et al. ........... | 210/772 |
| 4,579,949 | 4/1986 | Rochat et al. ................ | 546/256 |
| 4,619,770 | 10/1986 | Boston ........................ | 210/797 |

*Primary Examiner*—Richard V. Fisher
*Assistant Examiner*—Coreen Y. Lee
*Attorney, Agent, or Firm*—Harry Falber

[57] ABSTRACT

Process for separation and purifying pigment suspensions and suspensions of pigment intermediates in a liquid by means of a membrane separation process, whereby the suspension to be treated is uniformly fed to and circulated through a microfiltration unit containing at least one semi-permeable membrane and the separated liquid flows off through the membrane as permeate which process comprises replacing the permeate gradually by a washing liquid that differs from the first liquid such that the total amount of washing liquid fed into the system is 1 to 15 times the total volume of the initial suspension, and separating the resultant suspension from the liquid by means of conventional filtration or drying apparatus. The process is particularly suitable for processing fine pigment suspensions often obtained in pigment synthesis.

9 Claims, No Drawings

SEPARATION AND PURIFICATION OF PIGMENT SUSPENSIONS AND SUSPENSIONS OF PIGMENT INTERMEDIATES BY A MEMBRANE SEPARATION PROCESS

The present invention relates to a process for separating and purifying pigment suspensions and suspensions of pigment intermediates by a membrane separation process.

The filtration of pigment of suspensions, especially finely particulate suspensions, is often problematical. Even when at all possible, such pigment suspensions cannot be satisfactorily processed on an industrial scale using conventional filtration units such as vacuum drum filters, separators or filter presses. Lengthy filtration and washing times are required, and products of insufficient chemical purity are often obtained owing to the incomplete washing out of impurities. In addition, the properties of the isolated pigments are often so impaired by agglommeration of the pigment particles that the pigments themselves cannot be used in this form for the direct colouration of high molecular organic materials owing to insufficient dispersibility and/or colouristic properties. Furthermore, reproduction is usually unsatisfactory when using such filter units for processing fine pigment suspensions. Moreover the use of conventional filter units results in solvent losses.

For processing various suspensions of solids in liquids it has already been proposed to use membrane separation methods as described e.g. in outline articles published in "Farbe and Lack" 90, 57/1984, pp. 372–74, and in "Chem.-Ing.-Techn." 53 (1981), No. 4, pp. 227–36. In these methods, semi-permeable layers in the form of membranes are used to separate the filtrate (often called the permeate) from the suspended solid, the semi-permeable membrane being permeable to the liquid, e.g. water, but retaining undissolved substances present in the liquid.

It has now been found that the membrane separation process is particularly suitable for separating and purifying pigment suspensions, especially poorly filterable fine suspensions, as well as suspensions of pigment intermediates, if the permeate is replaced by a washing liquid that differs from the first liquid, so that the impurities such as unconverted started materials, by-products or inorganic salts, can be washed out and the resultant suspension can then be readily filtered direct or after further concentration using conventional filtration apparatus.

Accordingly, the present invention relates to a process for separating and purifying pigment suspensions and suspensions of pigment intermediates in a liquid by means of a membrane separation process, whereby the suspension to be treated is uniformly fed to and circulated through a microfiltration unit containing at least one semi-permeable membrane and the separated liquid flow off through the membrane as permeate, which process comprises replacing the permeate gradually by a washing liquid that differs from the first liquid such that the total amount of washing liquid fed into the system is 1 to 15 times the total volume of the initial suspension, and separating the resultant suspension from the liquid by means of conventional filtration or drying apparatus.

Suitable membranes are microporous membranes whose micropores are fine enough to retain the particles which it is desired to separate, but permit minimum resistance to the passage of the initial liquid and the washing liquid as well as the substances dissolved therein.

The membrane pore size can conveniently be adapted to the molecule size and structure of the substances to be separated. For example, the pores may be cylindrical, conical or irregular in shape. Membranes suitable for use in the process of this invention may have e.g. pore sizes of 0.1 to 5 microns ($\mu$), preferably of $1\mu$ to $2\mu$.

The most suitable membranes are those which are temperature-resistant, e.g. up to 200° C., are resistant to extreme pH values, as in alkalies and acids, as well as to organic solvents, i.e. do not swell therein, and which have good mechanical strength.

Examples of suitable membranes are those made of high molecular organic material such as teflon, and especially of inorganic materials such as porous ceramic, sintered metal such as iron, porous graphite and porous graphite coated with zirconium oxide or aluminum oxide.

The membranes can differ in shape, e.g. they can be plate-shaped or tubular.

The membranes eligible for use in the process of this invention are e.g. flat membranes with turbulence-inducing means, for example continuously washed membrane systems equipped with flat membranes, but are preferably membranes which are integrated in suitable systems, e.g. filter modules consisting of a tube in a metal or plastic housing that contains a microporous membrane, e.g. single tube or multi-tube filter modules. Depending on the pore size, pore shape and dimensions of the module, it is possible to achieve rates of flow of 50–5000 litres of suspension per hour and $m^2$ at a filtration pressure of 1 to 10 bar.

Examples of commercially available membrane systems suitable for use in the process of this invention are ceramic membranes supplied by CERAVER (France), NORTON (UK), zirconium-coated graphite membranes supplied by SFEC (France), metallic membranes supplied by MOTT (USA) and organic membranes made of teflon supplied by PUROLATOR (West Germany).

The process of this invention can be carried out at elevated temperature, e.g. in the temperature range up to 200° C., but preferably in the range from 20° to 100° C., and under pressure. The filtration rate can be varied and altered as desired.

The process parameters such as rate of flow, pressure, temperature and choice of membrane, in particular as regards pore size, will conveniently be chosen such that optimum separation of the liquid and washing of the suspension are effected at high rates of permeation and with superior separating efficiency.

It is preferred to use multi-tube filter modules.

The amount of washing liquid to be added to the permeate must be 1 to 15 time the total volume of the starting suspension, but is usually not crucial. It can be greater than, the same as or a fraction of, the volume of the permeate and should suffice to flush out all impurities and by-products up to the requisite permissible concentration.

The process of this invention can also be carried out in such a manner that a "serrated" washing is effected (i.e. the amount of washing liquid varies as a function of the time in serrated manner). In this procedure it is possible e.g. first to concentrate the pigment suspension, then to dilute it with washing liquid, and finally to concentrate it once more.

The process of the invention is preferably carried out such that the volume of washing liquid to be added to the permeate is approximately equal to the volume of the permeate that flows off and is 1 to 5 times the total volume of the starting suspension.

It can be advantageous to force the permeate through the membrane periodically at specific intervals of time, e.g. from 1 minute up to 2 hours, and at pulses of 1 to 10 seconds, in the opposite direction to filtration and washing, so that any substance particles which have penetrated the membrane can be flushed out.

Suspensions suitable for treatment by the process of this invention are suspensions of organic or inorganic pigments as well as suspensions of pigment intermediates in liquids, especially in the form of the fine suspensions often obtained in their synthesis. Liquids will be understood as meaning in the present context any organic solvents or mixtures of solvents employed in the synthesis of pigments and their intermediates. Examples of such liquids are: primary, secondary or tertiary alcohols such as methanol, ethanol, n-butanol, n-propanol, isopropanol, sec-butanol, tert-butanol and 2-methyl-2pentanol, glycols such as ethylene glycol or diethylene glycol, glycol ethers such a s ethylene glycol monomethyl or diethyl ether or ethylene glycol monoethyl or diethyl ether, diethylene glycol monomethyl or dimethyl ether or diethylene glycol monoethyl or diethyl ether, and also dipolar aprotic solvents such as acetonitrile, benzonitrile, dimethylformanide, N,N-dimethylacetamide, nitrobenzene or N-methylpyrrolidone, and aliphatic or aromatic hydrocarbons such as benzene or benzene substituted by alkyl, alkoxy or halogen, e.g. toluene, xylense, anisole, chlorobenzene, dichlorobenszenes or trichlorobenzenes, or aromatic N-heterocycles such as pyridine, picoline or quinoline.

A further suitable liquid is also water.

Examples of suitable inorganic pigments are: chromate pigments such as lead chromate or lead chromate sulfate pigments, or molybdate orange. Examples of suitable organic pigments are: mono- and disazo pigments, methine, azomethine, phthalocyanine, anthraquinone and perinone pigments, perylenetetracarboxylic acid derivatives, dioxazine, thioindigo, iminoisoindoline, iminoisoindolinone, quinophtahalone, quinacridone, pyrrolopyrrole or metal complex pigments, for example of methine or azomethine dyes, and also metal salts of azo dyes.

The washing liquids employed may be any solvents or mixtures of solvents, but preferably those in which the pigment to be treated or its intermediate is substantially insoluble. Suitable washing liquids are thus in principle all solvents listed above, with the proviso that the choice of solvent will depend greatly on the pigment structure. The most suitable solvents are those in which the pigment or its intermediate is virtually insoluble, but in which the impurities or by-products to be washed are soluble.

It may be expedient to repeat the washing procedure once or more than once by replacing the first washing liquid gradually by another washing liquid that differs therefrom, preferably such that the volume of said other washing liquid is 1 to 15, preferably 1 to 5, times greater than the volume of the first washing liquid. Suitable other washing liquids are solvents and mixtures of solvents of the indicated kind. If appropriate, the suspension obtained after the washing procedure can be concentrated prior to filtration or drying.

The process of this invention is particularly suitable for separating and washing fine pigment suspensions resulting from the synthesis of azo, azomethine, iminoisoindoline, iminoisoindolinone, pyrrolopyrrole and metal complex pigments, as well as suspensions of pigment intermediates in chlorobenzene, o-dichlorobenzene, nitrobenzene, toluene, exylenes or alcohols.

Compared with conventional filtration systems, the process of this invention affords a number of advantages such as no clogging of pores, complete washing out of impurities and no solvent losses, excellent efficiency, especially as regards the time required and the separation procedure, as well as high product quality and good reproducibility. Furthermore, the process is environmentally and toxicologically safe.

The system described hereinbelow shall serve to exemplify a membrane filtration unit suitable for use in the practice of this invention.

The suspension to be filtered is pumped from a conventional slurry tank and circulated uniformly through a filter module containing the membrane tube or tubes, while the permeate that flows off is replaced by a suitable washing liquid present e.g. in a second tank. The permeate is collected separately and the suspension flowing from the filter module is recycled for further treatment. The periodic pulsed back-rising can be triggered by a timing mechanism. The resultant pigment suspension, if desired after further concentration, can subsequently be filtered using a conventional filtration apparatus, e.g. a filter press, or fed direct to a drying unit. The filtrate is preferably washed with water and dried in conventional manner.

The pigments treated by the process of this invention can be used as obtained for colouring high molecular organic material such as varnishes, paints, printing inks, fibres or plastics. They are, however, also extremely suitable for the preparation of masterbatches, for example by simultaneously reducing the pigment content using internal kneaders or continuous kneaders, by which means it is also possible to obtain mixed shades.

In the following Examples parts are by weight.

EXAMPLE 1

5 liters of a 7% by weight aqueous alkaline synthesis suspension of the pyrrolopyrrole pigment ($\approx 350$ g of pigment) obtained according to Example 6 of U.S. Pat. No. 4,579,949, with subsequent steam distillation to expel tert-amyl alcohol, are pumped continuously from a conventional slurry tank and circulated through a microfiltration unit containing a semi-permeable membrane, and washed with 20 liters of methanol as follows:

The filtration unit consists of 3 graphite tubes of 6 mm diameter and 45 cm long (available from SFEC) and lined with zirconium oxide. These membranes have a cut-off level at a molecular weight of 40,000. At an average membrane pressure of 2.5 bar, a feed rate of 1400 1/h and a temperature of 50° C., initial rates of flow of 65 $1/m^2 \cdot h$ are obtained. The requisite pumping capacity is provided by a membrane pump. The washing procedure must be effected such that the volume of methanol added is as great as the volume of permeate that flows off and which is collected in a separate tank. The viscosity of the starting suspension is c. 500 mPa·s. The viscosity decreases with continuous washing and is <50 mPa·s at the conclusion of the washing procedure. The rate of permeation is greater than 85 $1/m^2 \cdot h$ at the conclusion of washing. The permeate is clear and only slightly reddish in colour. The resultant pigment suspension has a concentration of 6.5% and has a clear, red colour. The pH of this suspension is 7-8. The suspension can be readily filtered by conventional methods. Filtration in conventional manner yields a pigment which gives excellent colourations in respect of colouristic and pigment properties when incorporated in plastics and varnishes.

EXAMPLE 2

5 liters of the same aqueous alkaline synthesis suspension as in Example 1 are pumped continuously from a conventional slurry tank and circulated through a microfiltration unit equipped with ceramic membranes in the form of a module (type 1 P 19, available from CERAVER); length of membrane: 85 cm; diameter of channel: 4mm) having a pore size of 0.8 $\mu$m and an active membrane area of 0.2 m$^2$. Applying a pressure of 0.5 bar and at a rate of flow of 1.5 m/sec across the membrane and at a temperature of 45° C., the suspension is washed with 20 liters of methanol while keeping the level of the suspension in the tank constant. Rates of flow of c. 90 l/m$^2$·h are obtained under these conditions. The permeate that flows off is initially very darkly coloured, but becomes increasingly paler with continuous washing and at the conclusion has almost the clarity of water. The resultant methanolic pigment suspension (containing 343 g of pigment) has lost its original brownish-black discolouration and is a brilliant red colour. After evaporation of the solvent under reduced pressure, the pigment so obtained gives excellent colourations in respect of colouristic and pigment properties when incorporated in plastics or varnishes.

EXAMPLE 3

C.I. Pigment Red 144, prepared according to the process described in U.S. Pat. No. 2,741,658 and obtained from the synthesis as a 6% pigment suspension in o-dichlorobenzene, is pumped continuously from a slurry tank to a microfiltration unit for washing and replacement of the o-dichlorobenzene by water as follows:

The microfiltration unit is equipped with a graphite/-zirconium oxide membrane (ex SFEC) which is 130 cm long, has a channel diameter of 6 mm, a filter area of 0.025 m$^2$ and a molecular weight cut-off level of 5,000,000. The average operating pressure is 2 bar, the rate of feed is 1250 l/h, and the temperature is 30° C. The rate of permeation is 155 l/m$^2$·h under these operating conditions.

The 5 liters of pigment suspension are washed with the 5-fold amount of washing solution, viz. initially with 10 liters of isopropanol, then with a mixture of 0.7 liter of isoproanol and 0.3 liter of water, subsequently with a mixture of 0.5 liter of isopropanol and 0.5 liter of water, and finally with 13 liter of pure water, the permeate that flows off being replaced by the same amount of volume of the above washing liquids. After three washings, the solvent phase of the suspension contains 5% and, after the fifth washing, 0.7%, of o-dichlorobenzene. The pigment is virtually suspended in pure water. Conventional filtration of this suspension and drying the filter residue affords a pigment which is most suitable for colouring plastics and varnishes.

EXAMPLE 4

5 liters of an azocarboxylic acid chloride suspension (precursor of C.I. Pigment Red 220) in the form of a 16% pigment suspension in 0-dichlorobenzene is pumped from a slurry tank to a microfiltration unit and washed continuously with 10 liters of o-dichlorobenzene while keeping the level of the liquid constant.

The microfiltration unit is equipped with a membrane (length: 50 cm, diameter of channel 6 mm) of sintered metal (MOTT) having a pore size of 0.2 $\mu$m and an active membrane area of 0.01 m$^2$. Rates of flow of 85-125 l/m$^2$·h are obtained at a membrane pressure of 2.5 bar, a feed rate of 1.5 m/sec and a temperature of 30° C. The permeate which flows off is red but clear. The so purified precursor of C.I. Pigment Red 220, after condensation with the appropriate diamine and working up, gives C.I. Pigment Red 220 which gives excellent colourations in respect of colouristic and pigment properties when incorporated in plastics and varnishes.

EXAMPLE 5

4.3 liters of a 7% pigment suspension in methanol containing C.I. Pigment Yellow 110 (isoindolinone; obtained by a known process, e.g. that described in Farbe and Lack 72, No. 3 (1966), p. 208, column 1, lines 6-12 from the bottom, by reaction of methyl tetra-chloro-2-cyanobenzoate, a diamine and sodium methylate in methanol) are charged to the slurry tank of a microfiltration unit. The microfiltration membrane (type 1 P 19, supplied by Ceraver) of the unit consists of ceramic material, is 85 cm long, has a channel diameter of 4 mm and a pore size of 0.8 $\mu$m and a filter area of 0.2 m$^2$. The initial pressure applied at the membrane is 1.5 bar, the final pressure is 0.5 bar, and the temperature is adjusted to 40° C. The pigment suspension is washed first with 4.3 liters of methanol, then with the same amount of a 1:1 mixture (parts by volume) of methanol/water, and finally with 4×4.3 liters of pure water. This washing procedure is effected such that the original volume of the suspension (4.3 liters) is concentrated by microfiltration to 2 liters, then a first portion of washing liquid is added until the initial volume is attained, whereupon the volume is once more reduced to 2 liters and this procedure is continued until all the washing liquor has been consumed. In this "serrated" washing procedure, the flow of permeate fluctuates between 4500 ml/min at the point of highest dilution and 3600 ml/min at the highest pigment concentration, provided the rate of continuous flow of the suspension across the membrane is at least 2 m/sec. The treated pigment suspension is in the form of a pure aqueous suspension which contains only traces of methanol. After filtration and drying, the pigment so obtained gives excellent colourations in respect of colouristic and pigment properties when incorporated in plastics or varnishes.

EXAMPLE 6

For purification and conversion into an aqueous pigment suspension, 5 kg of a pigment suspension in o-dichlorobenzene [80 g of C.I. Pigment Yellow 109 (isoindolinone) per liter of o-dichlorobenzene] which has been prepared by a known process, e.g. in accordance with the process described in Farbe und Lack 72, No. 3 (1966), p. 208, column 1, lines 6-12 from the bottom, by reaction of methyl tetrachlorocyanobenzoate, a diamine and sodium methylate in o-dichlorobenzene) are fed into the 10 liter concentrate tank of a microfiltration unit. The microfiltration unit is equipped with membranes of sintered aluminum oxide (type 1 P 19, Ceravre). The pore size of these membranes (85 cm long, channel diameter 4 mm) is 0.45 μm, and the membrane area is 0.8 m². The suspension contained in the tank is diluted with 5 liters of o-dichlorobenzen and this mixture is subjected to microfiltration until the volume of the initial suspension is attained. Without discontinuing the course of the microfiltration, 4×5 liters of methanol are added and the suspension, after each addition, is again reduced to the original volume. Washing is effected twice in succession with 5 litres of a 1:4 mixture (parts by volume) of methanol/water in the manner just described. Finally, the methanol is removed by washing with 3×5 liters of water.

The following conditions apply during the course of the microfiltration:

initial pressure 1.2 bar
final pressure 0.8 bar
rate of flow across the membrane 2 m/sec
rate of permeation 200–300 $l/m^2 \cdot h$
temperature 35° C.

If the permeates of the first three washings still have a strong yellow discolouration caused by the impurities to be removed, then they become paler in colour with increased washing and are ultimately completely colourless with the clarity of water after the final washing procedure. The purified slurry is then in the form of an aqueous pigment suspension that contains less than 0.1% of o-dichlorobenzene. Conventional filtration and drying yield a pigment which gives excellent colourations in respect of colouristic and pigment properties when incorporated in plastics or varnishes.

What is claimed is:

1. A process for separating and purifying pigment suspensions and suspensions of pigment intermediates in a first liquid by means of a membrane separation process, whereby the pigment suspension to be treated is uniformly fed to and circulated through a microfiltration unit containing at least one semi-permeable membrane and the separated liquid flows off through the membrane as permeate, which process comprises replacing gradually said liquid flowing off through the membrane by feeding gradually into the suspension a washing liquid that differs from the first liquid such that the total amount of washing liquid fed in to the system is 1 to 15 times the total volume of the initial pigment suspension, and separating the resultant suspension from the liquid.

2. A process according to claim 1, wherein the microfiltration unit is a single tube or multi-tube filter module which contains a microporous membrane.

3. A process according to claim 1, wherein the microfiltration unit is a multi-tube filter module.

4. A process according to claim 1, wherein the membrane is made from inorganic material.

5. A process according to claim 4, wherein the membrane is selected from the group consisting of porous ceramic, sintered metals, porous graphite and porous graphite coated with zirconium oxide or coated with aluminium oxide.

6. A process according to claim 1, wherein the volume of washing liquid to be added to the permeate is approximately equal to the volume of the permeate that flows off and is 1 to 5 times the total volume of the initial pigment suspension.

7. A process according to claim 1, wherein the pore size of the membrane is 0.1 to 5 microns.

8. A process according to claim 1, wherein the rate of flow of the pigment suspension through the microfiltration unit is 45 to 450 litres per hour and m².

9. A process according to claim 1, wherein the suspensions to be treated are fine pigment suspensions resulting from the synthesis of azo, azomethine, iminoisoindolinone, iminoisoindoline, pyrrolopyrrole and metal complex pigments, as well as their intermediates, in chlorobenze, o-dichlorobenze, nitrobenzene, toluene, xylenes or in an alcohol.

* * * * *